Dec. 1, 1964    G. MUTH    3,159,082
MOLDS FOR AIR BAGS AND BLADDERS
Filed April 2, 1962    4 Sheets-Sheet 1
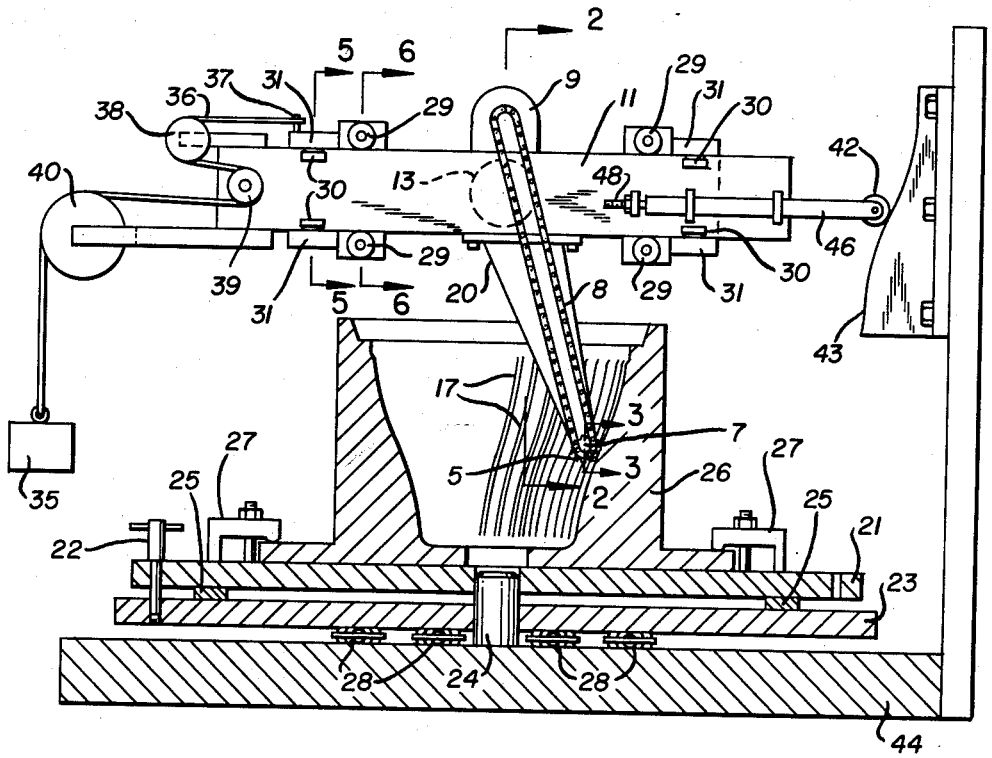
FIG. 1
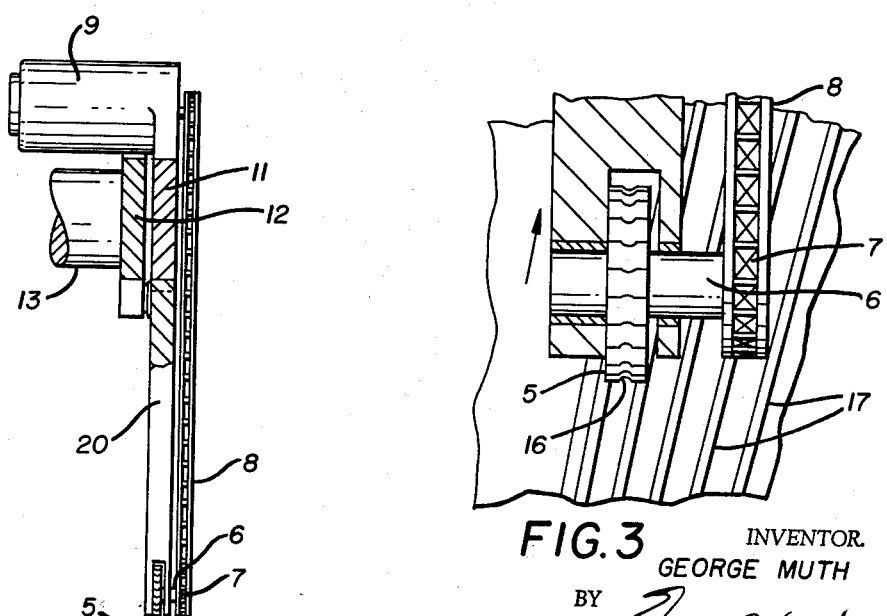
FIG. 2
FIG. 3
INVENTOR.
GEORGE MUTH
BY
Gordon C. Mack
ATTORNEY Dec. 1, 1964   G. MUTH   3,159,082
MOLDS FOR AIR BAGS AND BLADDERS
Filed April 2, 1962   4 Sheets-Sheet 2

INVENTOR.
GEORGE MUTH
BY
ATTORNEY

INVENTOR.
GEORGE MUTH
BY
ATTORNEY

United States Patent Office 3,159,082
Patented Dec. 1, 1964

3,159,082
MOLDS FOR AIR BAGS AND BLADDERS
George Muth, Northampton Township, Summit County, Ohio, assignor to Kohler Mold and Machine, Akron, Ohio, a corporation of Ohio
Filed Apr. 2, 1962, Ser. No. 184,311
2 Claims. (Cl. 90—13.4)

This invention relates to molds for air bags and bladders to be used in the curing of pneumatic tires. It includes the process of manufacturing the mold cavities and the equipment used.

According to this invention, ribs are formed close together on the inner surface of such molds, and they form grooves in the air bag or bladder. Unless such grooves are provided, air bubbles collect between the inner surface of the tire and the surface of the air bag or bladder, and when the tire mold is heated for curing a tire with an air bag or bladder in it, the air expands and forms a bubble which results in the production of a defective tire. The grooves are not located in radial planes but are located at an angle so that they cross the radial cords or wires in the air bag or tire, and therefore do not weaken the bag or tire as they would if they were radial and parallel to the cords or wires. The angle each groove makes with a radial plane is small, and may be only about ten degrees.

The circumference of the mold cavity is less at the bottom than at the top so the ribs tend to come together at the bottom of the side wall of the mold cavity. They need not extend into the bottom of the cavity. The ribs preferably get shallower as they extend from the bottom of the cavity wall to the rim.

The cutter used in shaping the wall of the mold cavity is formed with a groove, preferably near its center, to form a rib, and the surface of the cutter is preferably slightly rounded to conform to the desired curvature of the mold wall. The cutter might be formed with two or more grooves so as to cut two or more ribs simultaneously.

To produce the ribs, the crude mold is placed on a table, and several different movements are made to have the cutter follow the proper course over the mold surface.

(1) A slight relative rotational movement is produced between the cutter and the table as the cutter is moved in cutting relation with the mold; preferably the table is turned through a few degrees, and then while the cutter is withdrawn out of contact with the mold the table is turned back to bring the cutter into position to start the next cutting operation.

(2) Relative vertical movement is produced between the cutter and the mold, preferably by lifting the cutter while in contact with the mold surface, and the mold remains at a constant level.

(3) The cutter is maintained in contact with the surface of the mold cavity by outward pressure of the cutter against it, and the course the cutter follows is prescribed by a cam.

The invention will be further described in connection with the accompanying drawings, in which—

FIGURE 1 is a general over-all elevational view of the equipment in operation, and shows the mold in section;

FIGURE 2 is a somewhat enlarged detail of the cutter arm and cutter on line 2—2 of FIGURE 1;

FIGURE 3 is an enlarged detail of the mold surface with the cutter in operative contact with it;

Figure 4:
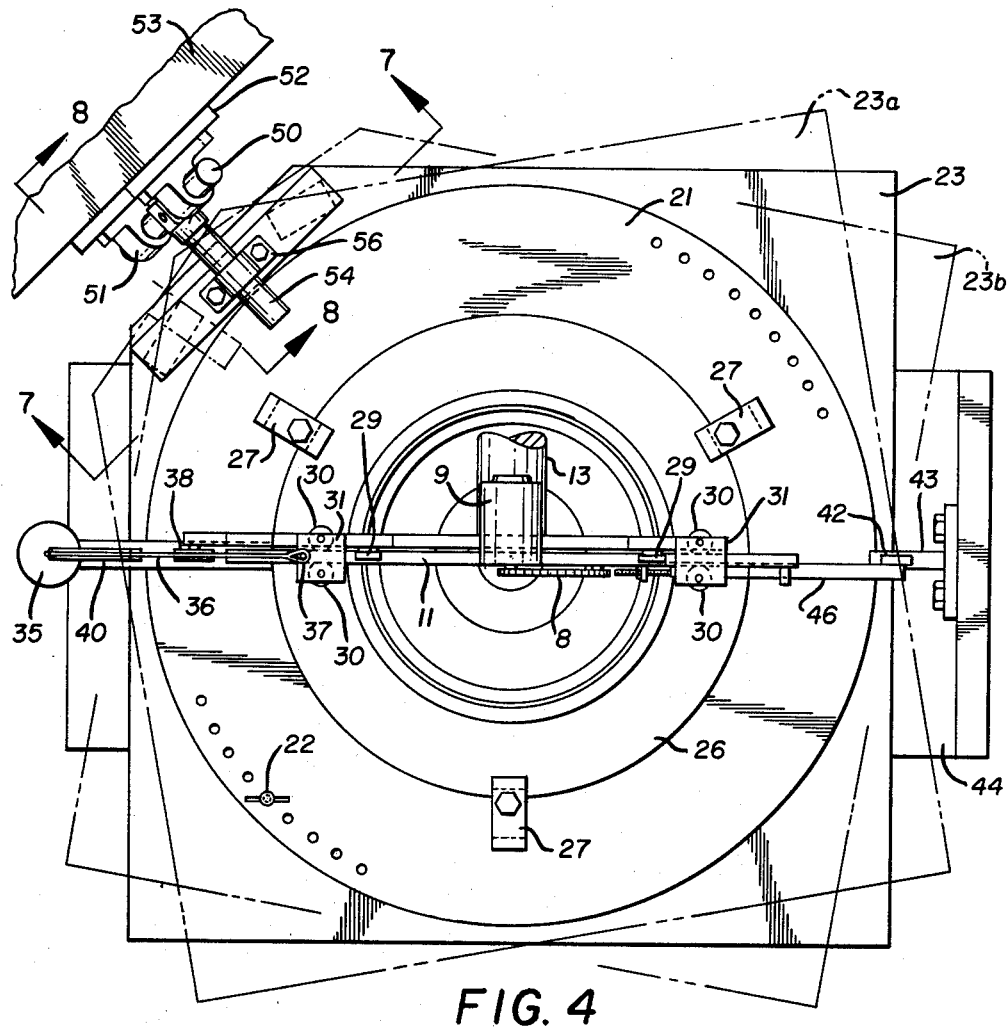
FIGURE 4 is a plan view of the equipment with the table shown in full lines in its position about half way up the wall of the mold (as shown in FIGURE 1) and with its position at the bottom and top of each stroke in dot-dash lines.

The cutter 5 is supported on shaft 6 to which is fastened sprocket 7 driven by chain 8. The chain is driven from motor 9. The motor 9 is mounted on operating plate 11 slidably supported on stationary plate 12 which in turn is mounted on shaft 13, which is conveniently mounted on the head of a drill press or other lifting means.

The cutter blade 5 is grooved at 16 to produce ribs 17, and its cutting surface is rounded to conform generally to the mold surface, although it is realized that the circumference of the mold is greater at the top than at the bottom. The shaft 6 which drives the cutter is rotatably mounted in the cutter arm 20, near its bottom. This arm is supported from the plate 11.

The round table 21 which supports the mold is indexed by pin 22 on turntable 23. By removing pin 22 and turning table 21 manually the cutter is brought to any desired radial position on the surface of the mold cavity. The table 23 turns freely about pin 24 on bronze blocks 25. In FIGURE 4 the table 23 is shown in full lines in the position it occupies when the cutter is about half way up the wall, and in phantom lines 23a and 23b in the positions it occupies when the cutter is operating at the bottom and top of the wall, respectively. The mold 26 is fastened to the table 21 by clamps 27. The table 23 turns about pin 24 on ball bearings 28.

Figure 5:
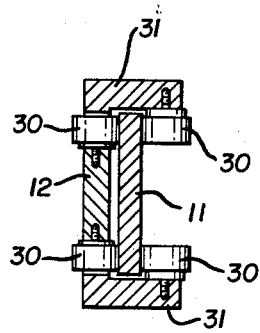
FIGURE 5 is a section on the line 5—5 of FIGURE 1.
Figure 6:
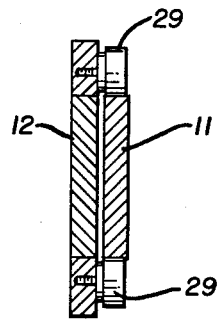
FIGURE 6 is a section on the line 6—6 of FIGURE 1.

The operating plate 11 which supports cutter arm 20 is located over the center of the mold. It slides horizontally between vertical rollers 29 (FIGURES 1, 2 and 6) and horizontal rollers 30 (FIGURES 4 and 5), the rollers all being mounted on the stationary plate 12 and small horizontal stationary plates 31.

The weight 35 is attached to one end of cord 36, and the other end is looped about pin 37 on one of the stationary plates 31. The cord passes over sheave 38 supported on stationary plate 12 and sheaves 39 and 40 supported on the slidable operating plate 11. This weight urges the plate 11 to the right, bringing the cam roller 42 against the cam plate 43 which is mounted on the stationary base 44. The roller 42 is on arm 46 which is adjustable at 48 for working on molds of different diameters.

The shaft 50 is supported in pillow blocks 51 mounted on the plate 52 on the drill press head or other lifting means 53. The stud 54 which is positioned radially with respect to the table 21, is fastened to shaft 50 by pin 55. Stud 54 passes through pillow block 56 mounted on bracket 57 which is fastened to the turntable 23.

Figure 7:
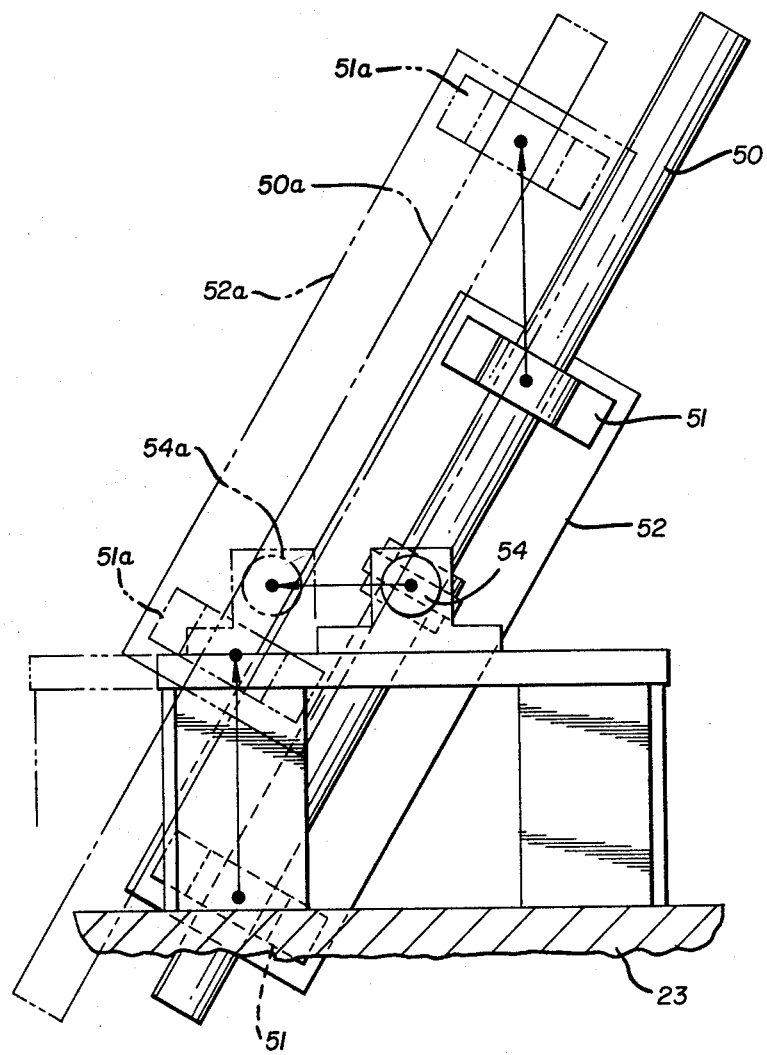
FIGURE 7 is a front elevation of the turning mechanism.
Figure 8:
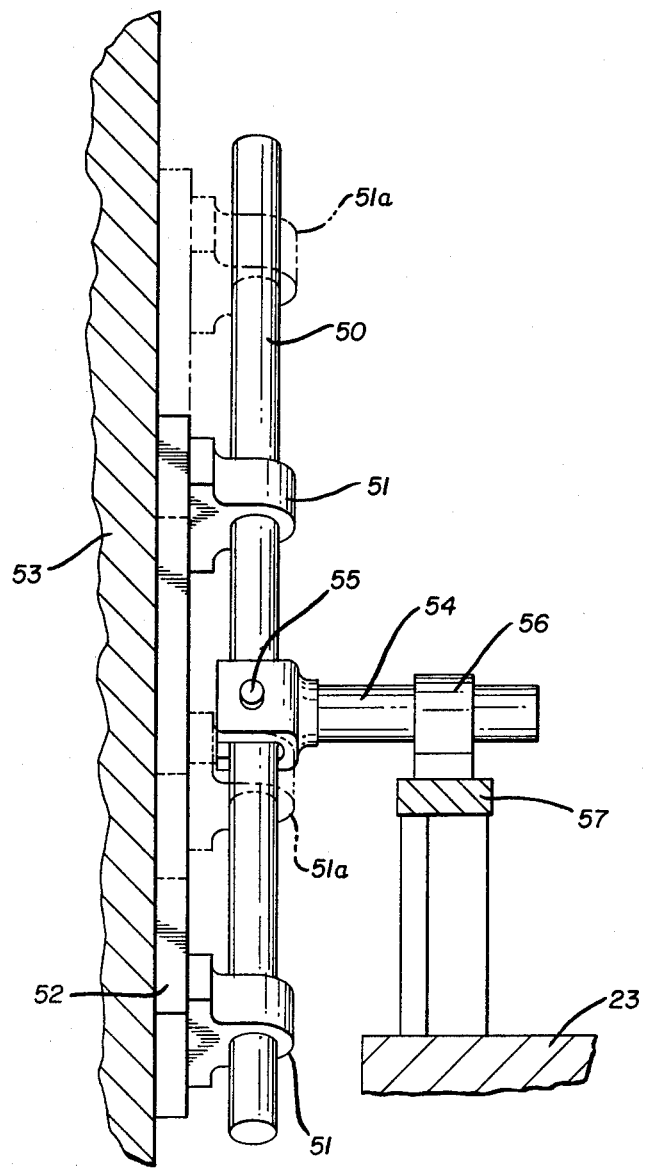
FIGURE 8 is a side view of the same.

As the head 53 is raised and lowered, the table 23 is turned in one direction and then the other. This is explained in connection with FIGURE 7 where it is supposed that the head 53 is raised and the elements shift from the positions shown in full lines to the positions shown in phantom and indicated by the reference numerals 50a, 51a, etc. The plate 52 and pillow blocks 51 are lifted with the head to the positions 52a and 51a, respectively. The shaft 50 is not raised but is held at a constant level by the stud 54, so it shifts in the pillow blocks to the position 50a while the stud 54 assumes position 54a. The stud moves the table 23 with it by means of bracket 57, etc., so that as the cutter is raised by the head, the table 23 is turned a few degrees. Consequently, the ribs formed by the cutter are not vertical but are at a slight angle as clearly shown in FIGURE 1. On completion of each cutting operation, the cutter is lowered and the table would return to its original position except for the fact that by resetting the indexing pin 22 the operator turns the mold to bring the cutter into position for cutting a new rib. In this manner ribs are cut around the entire circumference of the mold cavity with the edge of the path cut by the cutter in each traverse joining that made in the next preceding traverse.

The invention is covered in the claims that follow.

What I claim is:

1. Apparatus for cutting the surface of a cavity in a mold for an air bag or bladder, which includes a table for the support of the mold, a grooved cutter on a cutter arm with means for moving the same vertically and radially with respect to a central position on the table, means for producing a rotary movement between the cutter arm and the table and means at evenly spaced intervals about the table for preventing such rotation with each such interval corresponding substantially to the width of the cutter, a guide fixed on the cutter arm, a cam with a surface representing a vertical section through the intended outline of the wall of the mold cavity which cam is supported in a fixed vertical position with respect to the table, and means pressing the guide against the cam surface.

2. The apparatus of claim 1 in which the vertical position of the table is fixed, means is provided to rotate the table, and means is also provided for raising and lowering the cutter arm.

References Cited in the file of this patent

UNITED STATES PATENTS

| | | |
|---|---|---|
| 1,443,641 | Muller | Jan. 30, 1923 |
| 1,667,036 | Jahant | Apr. 24, 1928 |
| 2,330,566 | Edmonds et al. | Sept. 28, 1943 |